United States Patent [19]

Van Thillo et al.

[11] Patent Number: 5,008,178

[45] Date of Patent: Apr. 16, 1991

[54] SHEET OR WEB CARRYING AN ANTISTATIC LAYER

[75] Inventors: Etienne A. Van Thillo, Essen; Lucien J. Van Gossum, Kontich, both of Belgium

[73] Assignee: Agfa-Gevaert, N.V., Mortsel, Belgium

[21] Appl. No.: 305,391

[22] Filed: Feb. 2, 1989

[30] Foreign Application Priority Data

Mar. 22, 1988 [EP] European Pat. Off. .... EP88200531.7

[51] Int. Cl.[5] .......................... B32B 5/16; G03C 1/76

[52] U.S. Cl. .................................. 430/527; 428/331; 428/341; 428/452; 428/480; 428/537.5; 430/531; 430/533; 430/538

[58] Field of Search ............... 428/331, 341, 452, 480, 428/484, 537.5; 430/527, 531, 533, 538

[56] References Cited

U.S. PATENT DOCUMENTS 3,525,621 2/1968 Miller .................................. 430/529

*Primary Examiner*—George F. Lesmes

*Assistant Examiner*—Christopher Brown

*Attorney, Agent, or Firm*—Breiner & Breiner

[57] ABSTRACT

A sheet or web material being a subbed or unsubbed hydrophobic resin support or paper support coated with at least one hydrophobic resin layer having at least on one side an outermost antistatic layer containing colloidal silica, characterized in that the antistatic layer is free from any cationic surfactant and consists of at least 70% of weight of colloidal silica having an average particle size smaller thatn 7 nm and a surface area of at least 500 m2 per gram, the colloidal silica being present at a coverage of at least 50 mg per m2.

8 Claims, No Drawings

SHEET OR WEB CARRYING AN ANTISTATIC LAYER

DESCRIPTION

The present invention relates to a sheet or web material containing an antistatic layer.

The invention is particularly but not exclusively concerned with recording materials wherein a hydrophobic resin support carries a transparent antistatic layer and a recording layer, e.g. a light-sensitive silver halide emulsion layer.

It is known that hydrophobic resin sheet and web materials of low conductivity readily become electrostatically charged by friction with dielectric materials and/or contact with electrostatically chargeable transport means, e.g. rollers. The charging occurs particularly easily in a relatively dry atmospheric environment.

Sheets and webs of hydrophobic resins, e.g. polyesters or cellulosetriacetate, are commonly used as support element of recording materials. Such materials are subjected to frictional contact with other elements during their manufacture, e.g. during a coating or cutting stage, and during use, e.g. during the recording of information or—in the case of silver halide photographic materials—during image-processing or final image inspection or projection. Especially in the reeling-up or unreeling of dry photographic film in a camera or projector high friction may build up, resulting in electrostatic charges that may attract dust or cause sparking. In unprocessed photographic silver halide emulsion materials, sparking causes developable fog and degrades the image quality.

In order to reduce electrostatic charging of sheet or web materials comprising a hydrophobic resin support coated with at least one silver halide emulsion layer without impairing their transparency, it is known to incorporate ionic compounds in these materials, e.g. in the silver halide emulsion layer(s). In order to avoid diffusion of ionic compounds out of a silver halide emulsion layer during its different wet processing treatments, preference has been given to antistatic high molecular weight polymeric compounds having ionic groups at frequent intervals in the polymer chain [ref. Photographic Emulsion Chemistry, by G. F. Duffin-,—The Focal Press—London and New York (1966)—Focal Press Ltd., p. 168].

Anionic polymers containing carboxylate groups have good antistatic properties in the pH range above 6, but fail because of their low dissociation degree at lower pH values.

Anionic polymers containing sulphonic acid groups or a salt form thereof interact with amino groups of proteinaceous colloids at pH values above 4.5 and, if incorporated into coating solutions containing such colloids, cause a considerable increase in viscosity of the coating solutions and even flocculation thereof.

Cationic polymers containing protonated or quaternized amino groups, although being good antistatic agents, are often useless in photographic silver halide emulsion materials because of their fogging activity. This can be counteracted by using substantial amounts of anti-fogging agents, but only at the expense of photographic sensitivity. Moreover, such cationic polymers are not compatible with the use of anionic wetting agents as often incorporated in the coating composition of such materials because of the fact that the cationic part of said polymers interacts with the wetting agents whereby large complex compounds having little or no antistatic effect are formed.

From U.S. Pat. No. 3,525,621 (see column 4, lines 55–73) it is known that antistatic properties can be given to an aqueous coating composition by practically any silica sol, but preferably a silica of large surface area of the order of 200–235 m2 per gram in combination with an alkali metal salt of an alkylaryl polyethersulphonate, preferably (p-[1,1,3,3-tetramethyl-butyl]phenoxyethoxyethyl sodium sulfonate sold under the trade name TRITON X200 (TRITON is a registered trade mark of E. I. du Pont de Nemours and Co. Wilmington, Del., U.S.A.). From the comparative tests described in Example 10 it can be derived that when coated on a polyethylene coated paper stock said antistatic composition gives a much lower surface resistivity than by the use of colloidal silica alone. Such is in accordance with the description (column 3, lines 34–41) wherefrom it can be learned that colloidal silica alone imparts a very small antistatic effect and the ionic organic agent alone imparts a better antistatic effect but the two used together provide an antistatic effect that is significantly greater than would be expected from either material alone.

It has been established experimentally by us that the described alkali metal salt of an alkylaryl polyethersulphonate being a strongly watersoluble compound is leached out during photographic aqueous processing whereby the antistatic character of the substrate whereto the antistatic composition is applied markedly decreases so that no sufficient permanent antistatic character is retained after drying the processed material because the remaining colloidal silica itself fails in sufficiently lowering the surface resistivity.

It is an object of the present invention to provide sheet or web materials which include a hydrophobic resin support, e.g. polyethylene terephthalate resin support, or a paper support coated with a hydrophobic resin layer carrying a transparent antistatic layer that retains its antistatic properties practically undiminished even after repeated aqueous treatment and drying.

According to the present invention there is provided a sheet or web material being a subbed or unsubbed hydrophobic resin support or paper support coated with at least one hydrophobic resin layer and having on at least on one side thereof an outermost antistatic layer containing colloidal silica, characterised in that the antistatic layer is free from any cationic surfactant and consists for at least 70% by weight of colloidal silica having an average particle size not larger than 10 nm and a surface area of at least 300 m2 per gram, the colloidal silica being present at a coverage of at least 50 mg per m2.

The coverage of said colloidal silica in the antistatic layer is preferably in the range of 100 mg to 500 mg per m2.

The surface area of the colloidal silica is determined according to the BET-value method described by S. Brunauer, P. H. Emmett and E. Teller, J. Amer. Chem. Soc. 60, 309–312 (1938).

Although an anionic wetting agent may be present its presence is absolutely not a must for providing a permanent antistatic character to said sheet or web material after a wet photographic processing as applied in silver halide photography, so that the present invention includes said sheet or web materials in which the defined antistatic layer is free from any anionic wetting agent.

In order to obtain an antistatic layer wherein the silica particles can have good conductive contact with each other preferably no organic hydrophilic colloid binder such as gelatin is present therein.

Particularly low surface resistivity values are obtained by using an antistatic layer consisting for at least 80% by weight of colloidal silica having a surface area of 500 m2 per gram and having an average grain size smaller than 7 nm. Such type of silica is sold under the name KIESELSOL 500 (KIESELSOL is a registered trade name of Farbenfabriken Bayer AG, Leverkusen, West Germany).

The coating of the above defined antistatic layer proceeds from an aqueous colloidal dispersion optionally in the presence of a non-ionic and/or anionic surfactant, e.g. saponine, acting as a wetting agent.

A web or sheet according to the invention can incorporate more than one antistatic layer, each incorporating the colloidal silica as herein defined. For example there may be one such antistatic layer on each side of the hydrophobic resin support or resin-coated paper. In that way a particularly high resistance to dust attraction and sparking can be achieved.

An important use of the above defined antistatic coating is in the manufacture of photographic silver halide emulsion materials having a hydrophobic resin support or hydrophobic resin coated paper support.

Hydrophobic resin supports useful in the manufacture of photographic silver halide emulsion materials are well known to those skilled in the art and are e.g. made of polyester, polystyrene, polyvinyl chloride, polycarbonate, preference being given to polyethylene terephthalate. A preferred resin coated paper support is a poly-Alpha-olefin coated paper support such as a polyethylene coated paper support.

The hydrophobic resin support may be provided with one or more subbing layers known to those skilled in the art for adhering thereto a hydrophilic colloid layer. Suitable subbing layers for polyethylene terephthalate supports are described e.g. in U.S. Pat. Nos. 3,397,988, 3,649,336, 4,123,278 and 4,478,907.

The sheet or web material provided according to the present invention with the above defined antistatic layer is advantageously used as a support for (a) silver halide emulsion layer(s) forming a photographic silver halide emulsion type material in which the antistatic layer is preferably an outermost layer at the side opposite the silver halide emulsion layer(s).

According to a special embodiment friction lowering substance(s), e.g. dispersed wax particles (e.g. carnaubawax or montan wax particles), are present in the antistatic layer.

According to an other embodiment the antistatic layer is applied between a subbed hydrophobic resin support and a silver halide emulsion layer or a packet of silver halide emulsion layers and is in direct contact with a superposed silver halide emulsion layer.

The surface resistivity of a sheet or web material provided with an antistatic layer according to the present invention can be lower than 100 ohm/square.

The surface resistivity expressed in ohm/square (ohm/sq.) is measured by a test proceeding as follows:

after coating, the resulting antistatic layer is dried and conditioned at a specific relative humidity. The surface resistivity measurement is performed by placing two conductive copper poles having a length of 1.0 cm parallel to each other at a distance of 10 cm and measuring the resistance built up between said electrodes with a precision ohmmeter.

Photographic silver halide emulsion materials containing an antistatic layer according to the present invention may be of any type known to those skilled in the art. For example, they may be useful in continuous tone or halftone photography, microphotography and radiography. They can be advantageously used in black-and-white or colour photographic materials including likewise silver complex diffusion transfer reversal (DTR) materials as well as dye diffusion transfer materials on the basis of silver halide emulsion layers.

For the composition of silver halide emulsion layers reference is made e.g. to Research Disclosure 17,643 of December 1978.

In a particular embodiment of the present invention a silver halide photographic material is used that is provided at the rear side of the hydrophobic resin or resin-coated support (the side opposite the light-sensitive layer(s)) with an antihalation layer containing one or more pigments in admixture with a binder and the antistatic layer is applied thereon or between the support and the antihalation coating. The antireflection substance used in the antihalation coating, e.g. carbon black, may itself have antistatic properties. According to another embodiment, the antistatic layer containing the above defined colloidal silica is dyed with an antihalation dye that can be removed in the processing, e.g. by alkaline treatment or by a solvent or solvent mixture.

Apart from their use in photographic silver halide emulsion materials, an antistatic layer containing the above defined colloidal silica may be used in materials serving as an image-receiving material in the silver complex diffusion transfer process or in a dye diffusion transfer process as described e.g. in Angew. Chem. Int. Ed. Engl. 22, (1983) p. 191-209.

By using a recording material having an antistatic layer containing the above defined colloidal silica, problems caused by static charges can be avoided or substantially reduced. For example, the formation of static charges by contact of a silver halide emulsion layer face with the rear side of the recording material or caused by friction with substances such as rubber and hydrophobic polymeric binder, e.g. the binder constituent of phosphor screens used as X-ray intensifying screens, can be markedly reduced by employing one or more antistatic layers in accordance with the present invention. The build up of static charges and subsequent dust attraction and/or sparking, e.g. during loading of films in cassettes, e.g. X-ray cassettes, or in cameras, or during the taking of a sequence of pictures as occurs in automatic cameras using X-ray films, can be avoided.

Although the above defined colloidal silica is particularly useful in the forming of antistatic layers in photographic silver halide emulsion materials, it is likewise useful in reducing surface resistivity of photographic materials based on diazo-type compositions, vesicular-image forming materials, magnetic recording materials, electrographic or electrophotographic recording materials and mounting or drafting film.

The examples hereinafter set forth are directed to the use of an antistatic layer in combination with a polyethylene terephthalate resin support but other resin bases, e.g. made of polystyrene, polyvinyl chloride or polyethylene optionally being corona-discharge treated and/or subbed with (a) subbing layer(s) for improving the adherence of hydrophilic colloid layers will obtain a strong reduction in surface resitivity when coated with the herein described antistatic layer.

The following examples illustrate the present invention without however limiting it thereto.

All percentages and ratios are by weight unless otherwise mentioned.

EXAMPLE 1 (comparative example)

In a first test series an unsubbed polyethylene terephthalate support having a thickness of 0.1 mm was coated directly with an antistatic layer from aqueous colloidal silica dispersions with colloidal silica having a surface area (S.A.) as defined in Table 1 were applied at a coverage (COV.) also defined in Table 1.

The average particle size of the silica with S.A. value 200 was in the range of 15–20 nm, of the silica with S.A. value 300 in the range of 7–8 nm and for the silica with S.A. value 500 was smaller than 7 nm.

In a second test series a biaxially stretched and commonly double-side subbed polyethylene terephthalate support as used in the preparation of photographic silver halide emulsion materials and having a thickness of 0.1 mm was coated at one side with an antistatic layer consisting essentially of colloidal silica having a surface area (S.A.) and applied at a coverage (COV.) as defined in Table 1 furtheron.

In some of the samples of said test series wetting agent A, i.e. TRITON X200 (trade name for (p-[1,1,3,3-tetramethyl-butyl]phenoxyethoxyethyl sodium sulfonate) and in other samples wetting agent B, i.e. saponine was used at the coverage (mg/m2) given in Table 1.

The materials of both test series were conditioned at 30% relative humidity (R.H.) at 20° C. and their surface resistivity was measured as described herein and expressed in ohm/sq.

TABLE 1

| | | Wetting agent | | Surface resistivity | |
|---|---|---|---|---|---|
| S.A. m2/g | COV. mg/m2 | A mg/m2 | B mg/m2 | 30% R.H. Unsub. PET | $10^{10}$ ohm/sq. Sub. PET |
| 200 | 240 | — | 4.6 | 4.7 | 25 |
| 200 | 225 | 15 | — | 14 | 58 |
| 200 | 200 | 40 | — | 720 | 660 |
| 300 | 240 | — | 4.6 | 0.32 | 5.6 |
| 300 | 225 | 15 | — | 0.39 | 5.0 |
| 300 | 200 | 40 | — | 1.00 | 32 |
| 500 | 240 | — | 4.6 | 0.05 | 0.72 |
| 500 | 225 | 15 | — | 0.07 | 0.18 |
| 500 | 200 | 40 | — | 0.50 | 43 |

EXAMPLE 2 (comparative example)

Manufacture of photographic material with antistatic layer according to the present invention (material A1).

A double-side subbed polyethylene terephthalate support was coated at one side with a gelatin-silver bromide-iodide emulsion [AgBr/AgI (99/1 mole %] at a coverage of silver halide equivalent with 2.06 g of silver nitrate per m2. The gelatin to silver halide ratio was 2, the silver halide being expressed as an equivalent amount of silver nitrate. The average grain size of the silver halide was 0.35 μm. The emulsion layer included hydroquinone as the developing agent at a coverage of 0.40 g per m2.

At the side opposite to that of the silver halide emulsion layer an antistatic layer was coated at a wet coverage of 1 liter per 50 m2 from the following coating composition:

| | |
|---|---|
| 16.5% aqueous colloidal silica dispersion sold under the trade name KIESELSOL 500 | 72.7 ml |
| 10% aqueous saponine solution | 2 ml |
| isopropanol | 100 ml |
| water | 825 ml |

Manufacture of photographic material, Material A2.

The photographic material was identical to material A1 with the difference that the antistatic layer was coated from the following coating composition:

| | |
|---|---|
| 16.5% aqueous colloidal silica dispersion sold under the trade name KIESELSOL 500 | 72.7 ml |
| TRITON X200 (registered trade mark) for a 10% solids solultion in water of (p-[1,1,3,3-tetramethyl-butyl] phenoxyethoxyethyl sodium sulfonate | 2 ml |
| isopropanol | 100 ml |
| water | 852 ml |

The surface resistivity of said materials A1 and A2 was measured at 30% relative humidity (R.H.) at 20° C. after wet photographic processing including a common treatment with alkaline aqueous developer liquid, acid stop bath, thiosulphate fixing liquid and aqueous rinsing liquid. The measurement results are given in the following Table 2 together with the surface resistivity of a material A3 being free from antistatic coating.

TABLE 2

| Material | Surface resistivity before processing | $10^{10}$ ohm/sq. (30% R.H.) after processing |
|---|---|---|
| A1 | 0.72 | 3.5 |
| A2 | 660 | 1,900 |
| A3 | 3,200 | 100,000 |

We claim:

1. A sheet or web material being a subbed or unsubbed hydrophobic resin support or paper support coated with at least one hydrophobic resin layer having at least on one side an outermost antistatic layer containing colloidal silica, wherein the antistatic layer is free from any cationic surfactant and consists for at least 70% by weight of colloidal silica having an average grain size smaller than 7 nm and a surface area of at least 500 m2 per gram, the colloidal silica being present at a coverage of at least 50 mg per m2.

2. A sheet or web material according to claim 1, wherein said antistatic layer is free from organic hydrophilic colloid binder.

3. A sheet or web material according to claim 1, wherein the coverage of said colloidal silica is in the range of 100 mg to 500 mg per m2.

4. A sheet or web material according to claim 1, wherein said antistatic layer is coated from an aqueous dispersion of the colloidal silica in the presence of a non-ionic wetting agent.

5. A sheet or web material according to claim 1, wherein said support is a polyester resin support.

6. A sheet or web material according to claim 1, wherein said material is a photographic material containing (a) silver halide emulsion layer(s) on a subbed hydrophobic resin support or hydrophobic resin coated paper support.

7. A sheet or web material according to claim 6, wherein the antistatic layer is present at the side of the hydrophobic resin support opposite with respect to the silver halide emulsion layer(s).

8. A sheet or web material according to claim 1, wherein said antistatic layer contains friction lowering substances.

* * * * *